United States Patent
Anderson et al.

(10) Patent No.: US 11,414,170 B2
(45) Date of Patent: Aug. 16, 2022

(54) CENTRIFUGAL COMPRESSOR BASED ALTITUDE CONTROL DEVICE WITH ACTIVE VALVE SYSTEM

(71) Applicant: Aerostar International, Inc., Sioux Falls, SD (US)

(72) Inventors: Kevin Anderson, Mountain View, CA (US); Keegan Gartner, Mountain View, CA (US)

(73) Assignee: Aerostar International, Inc., Sioux Falls, SD (US)

( * ) Notice: Subject to any disclaimer, the term of this patent is extended or adjusted under 35 U.S.C. 154(b) by 943 days.

(21) Appl. No.: 16/134,135

(22) Filed: Sep. 18, 2018

(65) Prior Publication Data

US 2020/0086963 A1    Mar. 19, 2020

(51) Int. Cl.
| | |
|---|---|
| *B64B 1/70* | (2006.01) |
| *B64B 1/40* | (2006.01) |
| *F04D 27/02* | (2006.01) |
| *F04D 29/44* | (2006.01) |
| *B64B 1/62* | (2006.01) |

(52) U.S. Cl.
CPC ............... *B64B 1/70* (2013.01); *B64B 1/40* (2013.01); *B64B 1/62* (2013.01); *F04D 27/0215* (2013.01); *F04D 29/441* (2013.01)

(58) Field of Classification Search
CPC .... B64B 1/70; B64B 1/40; B64B 1/62; F04D 27/0215; F04D 29/441; F04D 25/084; F04D 27/008; F04D 29/464; F04D 27/0292; F05D 2250/52
See application file for complete search history.

(56) References Cited

U.S. PATENT DOCUMENTS

| | | | | |
|---|---|---|---|---|
| 8,998,128 | B2 * | 4/2015 | Ratner | ............. B64B 1/62 244/31 |
| 9,016,634 | B1 * | 4/2015 | Ratner | ............. B64B 1/40 244/137.4 |
| 9,174,720 | B1 * | 11/2015 | Ratner | ............. B64B 1/60 |
| 9,340,272 | B1 * | 5/2016 | DeVaul | ............. B64B 1/62 |
| 9,534,504 | B1 * | 1/2017 | Gartner | ............. B64B 1/62 |
| 10,124,875 | B1 * | 11/2018 | Farley | ............. B64B 1/40 |
| 2017/0331177 | A1 * | 11/2017 | MacCallum | ...... B64B 1/40 |
| 2019/0382094 | A1 * | 12/2019 | Anderson | ...... F16K 31/042 |
| 2019/0389554 | A1 * | 12/2019 | Anderson | ............. B64B 1/62 |

(Continued)

OTHER PUBLICATIONS

Cade Metz, Google's Internet-Beaming Balloon Gets a New Pilot: AI., https://www.wired.com/2016/09/project-loon-google-brings-ai-skies/, Nov. 14, 2019, pp. 1-7.

(Continued)

*Primary Examiner* — Valentina Xavier
(74) *Attorney, Agent, or Firm* — Schwegman Lundberg & Woessner, P.A.

(57) ABSTRACT

An altitude control system for an unmanned aerial vehicle includes a compressor assembly defining a plenum therein, a passive valve assembly coupled to a first portion of the compressor assembly and in fluid communication with the plenum, and an active valve assembly coupled to a second portion of the compressor assembly and in fluid communication with the plenum. A method of controlling an altitude of an unmanned aerial vehicle and an unmanned aerial vehicle are also provided.

15 Claims, 16 Drawing Sheets

(56) References Cited

U.S. PATENT DOCUMENTS

2020/0115024 A1* 4/2020 Anderson ................ B64B 1/64
2020/0198771 A1* 6/2020 Anderson ............... F16C 21/00

OTHER PUBLICATIONS

Cade Metz, Machine Learning Invades the Real World on Internet Balloons, https://www.wired.com/2017/02/machine-learning-drifting-real-world-internet-balloons/, 2017, pp. 1-5.
Dave Lee, Google owner Alphabet balloons connect flood-hit Peru., https://www.bbc.com/news/technology-39944929, May 17, 2017, pp. 1-4.

* cited by examiner

CENTRIFUGAL COMPRESSOR BASED ALTITUDE CONTROL DEVICE WITH ACTIVE VALVE SYSTEM

BACKGROUND

Technical Field

The present disclosure relates to controlling the flight of aerial vehicles, and more particularly, to altitude control systems utilizing active valve systems to control the flight path of aerial vehicles.

Background of Related Art

Unmanned aerial vehicles, such as balloons, may operate at substantial altitudes. In certain instances, such vehicles operate within the Earth's stratosphere, having favorably low windspeeds at an altitude between 18 and 25 km (11-15 mi). The dynamics of the stratosphere are such that the windspeed and wind direction varies at certain altitudes, which allows unmanned vehicles to rely on the windspeed and wind direction alone for navigation, without the need for additional propulsion means. In this manner, an unmanned vehicle simply needs to increase or decrease its altitude to change course or to increase its speed.

Various means may be employed to adjust the altitude of the unmanned vehicle, such as ballast in the form of air. Increasing or decreasing the amount of ballast present in balloon of the unmanned vehicle causes the unmanned vehicle to ascend or descend. A combination of valves and compressors are used to control the flow of ballast air into and out of the balloon, which in turn, controls the rate of ascent or descent of the unmanned vehicle. As can be appreciated, the pressure that can be achieved within the unmanned vehicle may be limited by the design of the compressor, which in turn, limits the size of the balloon. Additionally, the temperature of the various components of the unmanned vehicle, as well as leaks of ballast air, impacts the efficiency at which the unmanned vehicle consumes energy. The present disclosure seeks to address the shortcomings of prior altitude control systems.

SUMMARY

The present disclosure is directed to an altitude control system for an unmanned aerial vehicle including a compressor assembly defining a plenum therein, a passive valve assembly coupled to a first portion of the compressor assembly and in fluid communication with the plenum, and an active valve assembly coupled to a second portion of the compressor assembly and in fluid communication with the plenum.

In aspects, the compressor assembly may include a motor and an impeller in mechanical communication with the motor such that rotation of the motor causes a corresponding rotation of the impeller.

In certain aspects, the compressor assembly may include a diffuser having an upper surface defining a plurality of apertures therethrough that is in fluid communication with the plenum.

In other aspects, the passive valve assembly may be disposed within a portion of an aperture of the plurality of apertures of the diffuser.

In certain aspects, the passive valve assembly may include an umbrella valve that is configured to abut a portion of the upper surface of the diffuser to inhibit the flow of fluid through the aperture of the plurality of apertures of the diffuser.

In aspects, the umbrella valve may be configured to transition from a first, closed position where fluid is inhibited from flowing through the aperture of the plurality of apertures to a second, open position where fluid is permitted to flow through the aperture of the plurality of apertures.

In other aspects, the active valve assembly may be disposed within an aperture of the plurality of apertures of the diffuser.

In certain aspects, the active valve assembly may include a solenoid, a valve support coupled to a portion of the solenoid, and an umbrella valve coupled to a portion of the valve support.

In aspects, the umbrella valve of the active valve assembly may be configured to abut a portion of the upper surface of the diffuser to inhibit flow of fluid through the aperture of the plurality of apertures of the diffuser.

In other aspects, the solenoid may be configured to translate the umbrella valve from a first, closed position where fluid is inhibited from flowing through the aperture of the plurality of apertures to a second, open position where fluid is permitted to flow through the aperture of the plurality of apertures.

In aspects, the compressor assembly may include a diffuser, a compressor housing configured to selectively engage the diffuser, and an intake configured to selectively engage the compressor.

In certain aspects, the diffuser and the compressor housing may cooperate to define a plenum therebetween.

In other aspects, the intake may include an upper portion and a lower portion, the lower portion defining a bellmouth configuration.

In accordance with another aspect of the present disclosure, a method of controlling an altitude of an unmanned aerial vehicle includes causing a solenoid of an altitude control system to translate from a first, closed position where an umbrella valve is seated against an upper surface of a diffuser to a second position where the umbrella valve is spaced apart from the upper surface of the diffuser to permit fluid to flow out of a ballonet that is disposed within an interior portion of a balloon, thereby causing the unmanned aerial vehicle to descend in altitude.

In aspects, causing the solenoid to translate may include causing a plurality of solenoids to translate from a first position, where each respective umbrella valve of each solenoid of the plurality of solenoids is seated against the upper surface of the diffuser to a second position where each respective umbrella valve of each solenoid of the plurality of solenoids is spaced apart from the upper surface of the diffuser.

In certain aspects, causing the solenoid to translate may include causing less than all of the plurality of solenoids to translate from the first position to the second position, thereby controlling the rate of descent of the unmanned aerial vehicle.

In accordance with yet another aspect of the present disclosure, an unmanned aerial vehicle includes a balloon configured to train a lifting gas therein, the balloon including a ballonet disposed therein that is configured to retain ballasting gas therein, and an altitude control system. The altitude control system includes a compressor assembly defining a plenum therein, a passive valve assembly coupled to a first portion of the compressor assembly and in fluid communication with the plenum, and an active valve assembly coupled to a second portion of the compressor assembly and in fluid communication with the plenum.

In aspects, the compressor assembly may include a diffuser having an upper surface defining a plurality of apertures therethrough that is in fluid communication with the plenum.

In certain aspects, the active valve assembly may be disposed within an aperture of the plurality of apertures of the diffuser.

In other aspects, the active valve assembly may include a solenoid, a valve support coupled to a portion of the solenoid, and an umbrella valve coupled to a portion of the valve support.

BRIEF DESCRIPTION OF THE DRAWINGS

Various aspects and features of the present disclosure are described hereinbelow with reference to the drawings, wherein.

DETAILED DESCRIPTION

Figure 1:
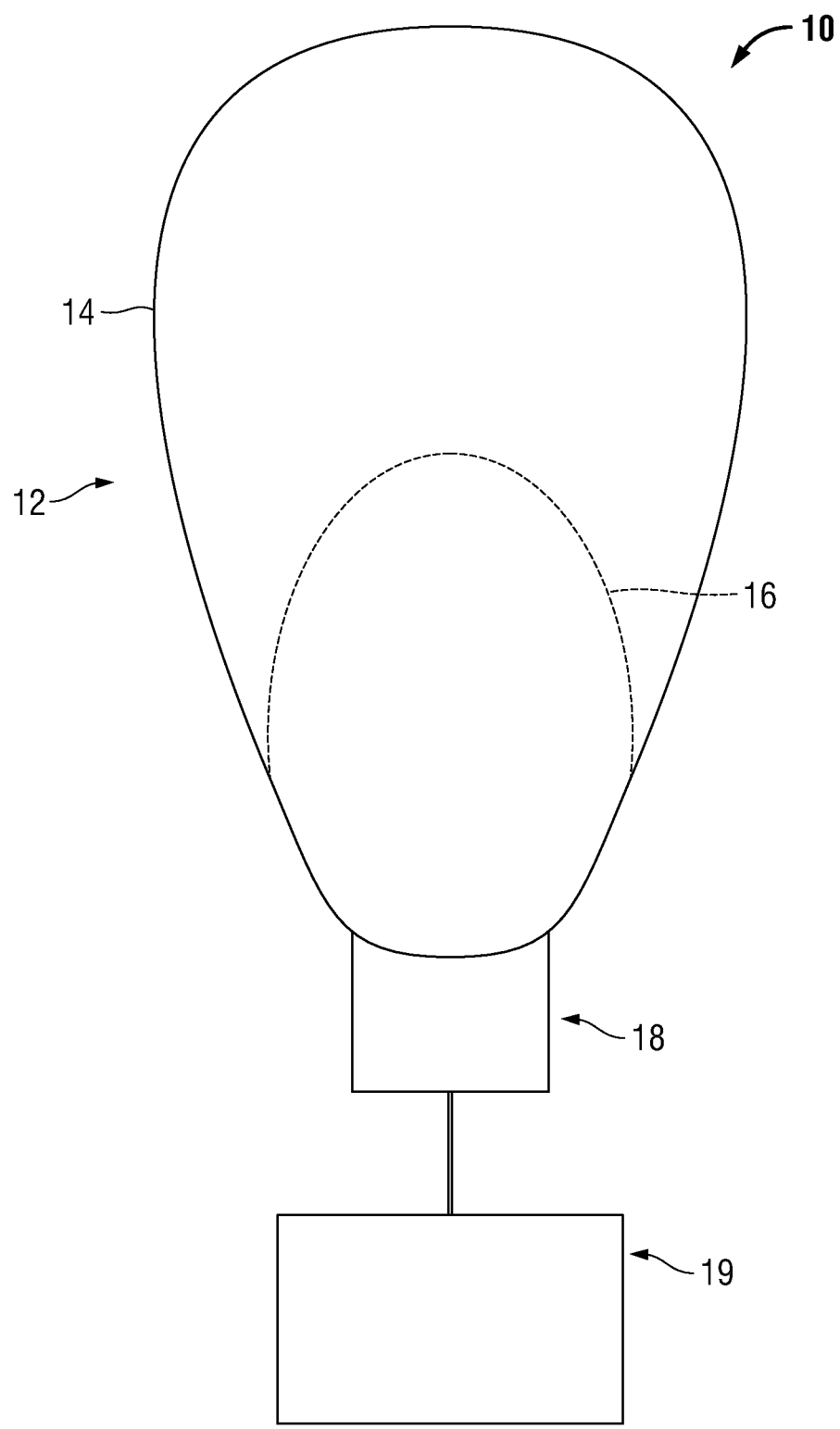
FIG. 1 is an elevation view of an unmanned aerial vehicle provided in accordance with the present disclosure.

The present disclosure is directed to unmanned aerial vehicles utilizing active valve systems to control the rate of ascent and descent of the unmanned vehicle. The unmanned aerial vehicle includes a balloon having an envelope and a ballonet disposed therein, an altitude control system, and a payload. The altitude control system includes a compressor assembly, a plurality of passive valve assemblies, a plurality of active valve assemblies, and an electrical control assembly. The compressor assembly includes a diffuser defining a plurality of apertures therethrough. The compressor assembly includes a compressor housing coupled to the diffuser, an intake coupled to the compressor housing, and a compressor plate coupled to the diffuser. The diffuser, compressor housing, intake, and compressor plate cooperate to define a plenum that is in fluid communication with a plurality of apertures defined through the diffuser. The compressor assembly also includes a motor coupled to a portion of the compressor plate and an impeller mechanically coupled to the motor and disposed within a portion of the plenum. The impeller is caused to be rotated by the motor to draw air into the plenum, through the plurality of apertures, and into the ballonet to increase the mass of the unmanned aerial vehicle and cause the unmanned aerial vehicle to descend.

The plurality of passive valve assemblies includes an umbrella valve and is disposed within respective apertures of the plurality of apertures. The umbrella valve is configured to transition from a first, closed position where fluid is inhibited from flowing through the respective apertures of the plurality of apertures to a second, open position where fluid is permitted to flow through the plurality of apertures. In this manner, the pressure within the ballonet acts on an upper surface of the umbrella valve to create a seal between the umbrella valve and the upper surface of the upper plate. To cause the umbrella valve to transition to the second, open position, the impeller is caused to be rotated in a first direction to draw fluid into the plenum. As the impeller is further rotated, the pressure within the plenum increases until the pressure acting on a lower surface of the umbrella valve is greater than the pressure acting on the upper surface of the umbrella valve, thereby causing the umbrella valve to deflect and transition from the first, closed position to the second, open position.

The plurality of active valve assemblies includes a solenoid, a valve support coupled to a portion of the solenoid, and an umbrella valve coupled to a portion of the valve support. The solenoid is configured to translate the umbrella valve from a first, closed position where fluid is inhibited from flowing through the respective apertures of the plurality of apertures to a second, open position where fluid is permitted to flow through the plurality of apertures. In embodiments, a portion or all of the solenoids of the plurality of valve assemblies may be caused to open to vary the mass of fluid that is permitted to flow into or out of the ballonet.

The electrical control assembly includes a motor thermal sensor, an electronic speed control thermal sensor, a compressor housing thermal sensor, a barometer, a differential pressure sensor, and a microphone. The motor thermal sensor is configured to determine the temperature of the motor housing, the electronic speed control thermal sensor is configured to determine the temperature of the electronic speed control circuit, the compressor housing thermal sensor is configured to determine the temperature of the compressor housing of the system, the barometer is configured to determine the ambient pressure of the surrounding atmosphere, the differential pressure sensor is configured to compare the pressure between the surrounding atmosphere and the inside of the ballonet, and the microphone is configured to determine if any of the passive or active valve assemblies are leaking. As can be appreciated, the combination of sensors of the sensor assembly enables the altitude control system to operate more efficiently and utilize less electrical energy than otherwise possible.

Embodiments of the present disclosure are now described in detail with reference to the drawings in which like reference numerals designate identical or corresponding elements in each of the several views. In the drawings and in the description that follows, terms such as front, rear, upper, lower, top, bottom, and similar directional terms are used simply for convenience of description and are not intended to limit the disclosure. In the following description, well-known functions or constructions are not described in detail to avoid obscuring the present disclosure in unnecessary detail.

Turning now to the drawings, FIG. 1 illustrates an unmanned aerial vehicle provided in accordance with the present disclosure generally identified by reference numeral 10. The unmanned aerial vehicle 10 includes a high altitude balloon 12 having an envelope 14 and a ballonet 16, an altitude control system 18, and a payload 19. In embodiments, the unmanned aerial vehicle 10 may include one or more cut-down systems (not shown) interposed between the altitude control system 18 and the payload 19.

Although generally illustrated as having a prolate spheroid profile, it is contemplated that the envelope 14 of the balloon 12 may define any suitable profile, such as spheroid, oblate spheroid, etc. It is contemplated that the envelope 14 of the balloon 12 may be formed from any suitable material, an in embodiments, may be formed from metalized MYLAR®, biaxially-oriented polyethylene terephthalate (BoPet), or at least partially from a highly-flexible latex material or a rubber material such as chloroprene. As can be appreciated, the materials, profile, and/or size of the envelope 14 may vary depending upon the particular needs of the application. The envelope 14 is filled with a lifting gas or other fluid capable of providing lift, such as helium, hydrogen, a helium-hydrogen mixture, or other suitable fluids or mixtures being lighter than air.

Continuing with FIG. 1, the bladder or ballonet 16 of the balloon 12 is disposed within the envelope 14 and is in open communication with the altitude control system 18, as will be described in further detail hereinbelow. The ballonet 16 is configured to be selectively inflated or deflated with a ballasting gas or other fluid that is heavier than the lifting gas disposed within the envelope 14. As can be appreciated, because the balloon 12 is a superpressure balloon having a fixed volume, the mass of ballasting gas contained within the ballonet 16 affects the buoyancy of the balloon 12. In this manner, increasing the mass of ballasting gas within the ballonet 16 causes the unmanned vehicle 10 to descend in altitude, whereas decreasing the mass of ballasting gas within the ballonet 16 causes the unmanned vehicle 10 to ascend in altitude. Although generally described as having one ballonet 16, it is contemplated that the balloon 12 may include any number of ballonets 16 depending upon the design needs of the unmanned vehicle 10.

For a detailed description of exemplary balloons capable of being utilized with the altitude control systems disclosed herein, reference may be made to commonly owned U.S. patent application Ser. No. 15/622,119 titled "Electrolysis Systems and Methods for Life Extension of an Apparatus Such as a Balloon," to Sergey Vichik et al., filed Jun. 14, 2017, the entire content of which is hereby incorporated by reference herein.

With reference to FIGS. 1-23, to effectuate the change in mass within the ballonet 16 of the balloon 12, the altitude control system 18 includes a compressor assembly 20, a plurality of passive valve assemblies 30, a plurality of active valve assemblies 40, and an electrical control assembly 60. The compressor assembly 20 includes a diffuser 22, a compressor housing 24, an intake 26, and a compressor plate 28. The diffuser 22 defines a generally planar configuration having a circular profile, although it is contemplated that the diffuser 22 may include any suitable profile, such as square, rectangular, and oval, amongst others. The diffuser 22 extends between an upper surface 22a and a second, opposite surface 22b. The upper and lower surfaces 22a, 22b of the diffuser 22 define a bore 22c therethrough at a center portion of the diffuser 22. A plurality of bosses 22d is disposed on the upper surface 22a of the diffuser 22 and extends therefrom. Each boss of the plurality of bosses 22d terminates at an end surface 22e having a generally planar profile, although it is contemplated that the end surface 22e of the plurality of bosses 22d may include any suitable profile, such as concave or convex, amongst others. It is contemplated that the diffuser 22 may include any number of bosses 22d disposed thereon, and in one non-limiting embodiment, the diffuser 22 includes 10 bosses 22d disposed thereon. The end surface 22e of each of the plurality of bosses 22d and the lower surface 22b of the diffuser 22 define a corresponding aperture 22f therethrough. Approximately half of the apertures 22f include a support structure 22g disposed therein defining a generally cross or plus-symbol configuration. In this manner, the support structure 22g includes a hole 22h defined therethrough at a center portion thereof and a plurality of cross-members 22i extending therefrom and terminating at an outer circumference thereof. Each of the support structures 22g is configured to support a respective passive valve assembly 30, as will be described in further detail hereinbelow.

The compressor housing 24 defines a generally dish shaped profile having a circular configuration (e.g., the outer dimension of the compressor housing 24 decreases along a longitudinal axis X-X defined through a center portion of the compressor housing 24). Although generally illustrated as having a circular configuration that corresponds to the circular configuration of the diffuser 22, it is contemplated that the compressor housing 24 may include any suitable configuration, such as square, rectangular, and oval, amongst others, and may be the same or different configuration as the diffuser 22. The compressor housing 24 extends between an upper surface 24a and an opposite, lower surface 24b. The lower surface 24b of the compressor housing 24 transitions to an inlet 24c having a cylindrical profile that is coaxial with the longitudinal axis X-X. In this manner, the profile of the compressor housing 24 transitions from a dish shaped profile to a cylindrical profile. The inlet 24c extends from the lower surface 24b along the longitudinal axis X-X and terminates in a bottom surface 24d that is configured to engage a portion of the intake 26, as will be described in further detail hereinbelow. The lower surface 24b of the compressor housing 24 defines a plurality of through-holes 24e that is configured to receive a corresponding plurality of active valve assemblies 40, as will be described in further detail hereinbelow. As can be appreciated, each through-hole of the plurality of through-holes 24e is concentrically aligned with a corresponding aperture of the plurality of apertures 22f of the diffuser 22. The top surface 24a and the bottom surface 24d define a cavity 24f therethrough to enable air or other fluid to flow through the compressor housing 24, as will be described in further detail hereinbelow.

The intake 26 defines a generally cylindrical profile extending between an upper portion 26a and an opposite, lower portion 26b. The intake defines a flared or swaged portion (e.g., a bellmouth profile) at the lower portion 26b thereof, although it is contemplated that any suitable profile may be utilized. The upper portion 26a of the intake 26 is configured to be selectively coupled to the compressor housing 24 adjacent the bottom surface 24d of the inlet 24c using any suitable means, such as a threaded connection, friction fit, welding, snap-ring, bonding, and fasteners, amongst others. The upper and lower portions 26a, 26b of the inlet 26 define a bore 26c therethrough defining a profile that generally coincides with the profile of the intake 26, although any suitable profile may be utilized depending upon the design needs of the compressor assembly 20. In this manner, an upper portion of the bore 26c defines a generally circular profile and a lower portion of the bore 26c defines a flared or swaged portion (e.g., bellmouth profile) extending radially outward.

The compressor plate 28 defines a generally cylindrical profile extending between an upper surface 28a and an opposite, lower surface 28b. The upper surface 28a of the compressor plate 28 includes a boss 28c disposed thereon, extending therefrom, and terminating at a top surface 28d. The top surface 28d defines a counterbore 28e therein and terminating at an inner surface 28f. The inner surface 28f includes a motor mount 28g disposed therein that is configured to selectively couple a motor of a compressor to the compressor plate 28 using any suitable means, such as fasteners, friction fit, welding, adhesives, amongst others. The lower surface 28b defines a relief 28h therein. As can be appreciated, the relief 28h is configured to provide clearance for an impeller of the compressor assembly 20 to inhibit the compressor plate 28 from interfering with rotation of the impeller, as will be described in further detail hereinbelow.

When the compressor assembly 20 is assembled, the upper surface 28a of the compressor plate 28 is configured to abut a portion of the second surface 22b of the diffuser 22 and be selectively coupled thereto using any suitable means such as fasteners, adhesives, friction fit, welding, amongst others. A portion of the second surface 22b of the diffuser 22 is configured to abut a portion of the upper surface 24a of the compressor housing 24 and be selectively coupled thereto using any suitable means such as fasteners, adhesives, friction fit, welding, amongst others. The upper portion 26a of the intake 26 is configured to be selectively coupled to the compressor housing 24 adjacent the bottom surface 24d of the inlet 24c using any suitable means, such as a threaded connection, friction fit, adhesives, welding, snap-ring, and fasteners, amongst others. In embodiments, it is contemplated that a gasket (not shown) or other means for creating a seal between each of the diffuser 22, compressor housing 24, intake 26, and compressor plate 28 may be utilized, depending upon the design needs of the compressor assembly 20. Although generally described as being formed from several components coupled together (e.g., the diffuser 22, the compressor housing 24, and the intake 26), it is contemplated that the compressor assembly 20 may be formed from a single component (e.g., monolithically formed), depending upon the design needs of the altitude control system 18.

When assembled, the diffuser 22 and the compressor housing 24 cooperate to define a cavity or plenum 20a therebetween. In this manner, the plurality of apertures 22f of the upper plate fluidly couples the interior of the ballonet 16 of the balloon 12 to the plenum 20a, and therefore the bore 26c of the intake 26. As can be appreciated, the plurality of apertures 22f, the plenum 20a, and the bore 26c of the intake 26 cooperate to fluidly couple the interior of the ballonet 16 to the environment outside of the ballonet 16 (e.g., air or other fluids may freely flow into and out of the ballonet 16 of the balloon 12). As will be described in further detail hereinbelow, control of this flow into and out of the ballonet of the balloon 12 controls the buoyancy of the balloon 12.

Figure 13:
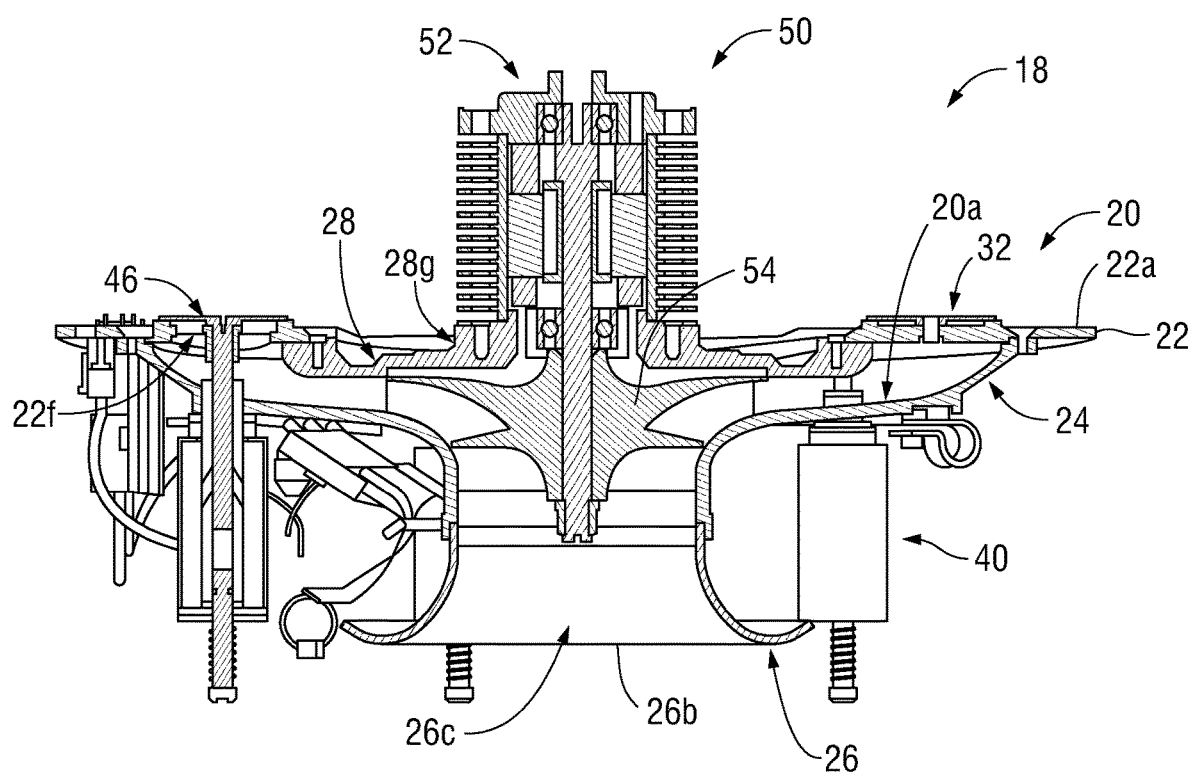
FIG. 13 is a cross-sectional view of the altitude control system of FIG. 2 taken along section-line 13-13 of FIG. 3.

With reference to FIG. 13, the compressor assembly 30 also includes a motor 52 and an impeller 54 mechanically coupled to the motor 52. The motor 52 is selectively coupled to the motor mount 28g of the compressor plate 28 using any suitable means, such as fasteners, friction fit, adhesives, welding, amongst others. The impeller 54 is coupled to a portion of the motor 82 such that the impeller 54 is disposed within a portion of the plenum 20a and a portion of the bore 26c of the intake 26. In embodiments, it is contemplated that the impeller 54 may be disposed entirely or within a portion of the bore 26c of the intake 26 or entirely or within a portion of the plenum 20a, depending upon the design needs of the altitude control system 18.

The impeller 54 is configured to be rotated in a first direction by the motor 52 to draw air or fluid from the environment surrounding the altitude control system 18 into the bore 26c of the intake 26, through the plenum 20a, through the plurality of apertures 22f, and into the ballonet 16 of the balloon 12 to increase the mass of air or fluid therewithin. As can be appreciated, the impeller 54 may be coupled to the motor 52 using any suitable means, such as a collet, coupling, lock-nut (e.g., "Jesus Nut"), amongst others. To decrease the mass of air or fluid within the ballonet 16, the motor 52 may cause the impeller 54 to rotate in a second, opposite direction to draw air or fluid from the ballonet 16, through the plurality of apertures 22f, into the plenum 20a, and out of the bore 26c of the intake 26 into the surrounding environment. As can be appreciated, the plurality of passive valve assemblies 30 and the plurality of active valve assemblies 40, as individual components or combinations thereof, may be used to control the flow of air or fluid through the intake 26 without the use of the motor 52. In this manner, the superpressure of the balloon 12 is utilized to force the air of fluid within the ballonet 16 to flow out of the ballonet 16 and through the intake 26, as will be described in further detail hereinbelow. It is contemplated that any suitable means of controlling the motor 52 may be employed.

As can be appreciated, the various components of the altitude control system 18 may be formed from any material suitable for use in high altitude conditions, such as metallic materials (e.g., steel, aluminum, magnesium, alloys thereof, and/or the like), non-metallic materials (e.g., polymers, ceramics, composites, and/or the like), amongst others or any combination thereof, depending upon the design needs of the altitude control system 18.

For a detailed description of exemplary control systems for controlling the motor 52, and thereby the compressor assembly 20, reference may be made to commonly owned U.S. patent application Ser. No. 15/662,940 titled "Systems and Methods for Controlling Aerial Vehicles," to Candido et al., filed on Jul. 28, 2017, commonly owned U.S. Pat. No. 9,534,504 to Gartner, titled "Hans Bell Housing for Inflating and Deflating a Balloon Envelope," and commonly owned U.S. Pat. No. 8,998,128 to Ratner, titled "Umbrella Valves to Inflate Bladder in Balloon Envelope," the entire content of each of which is hereby incorporated by reference herein.

Figure 14:
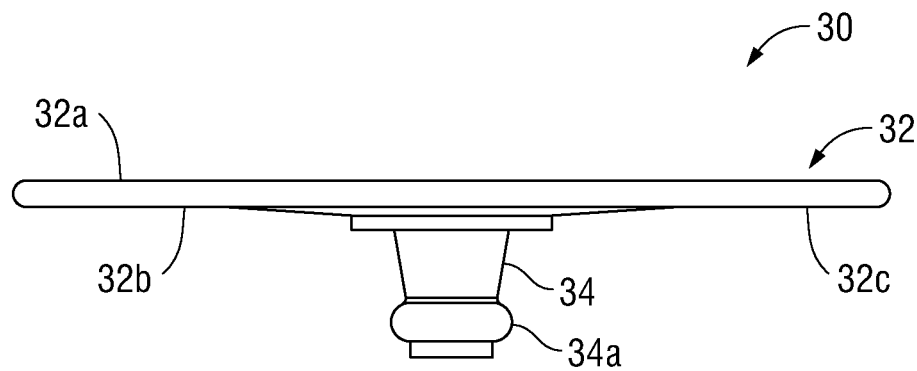
FIG. 14 is an elevation view of an umbrella valve of the altitude control system of FIG. 2.
Figure 15:
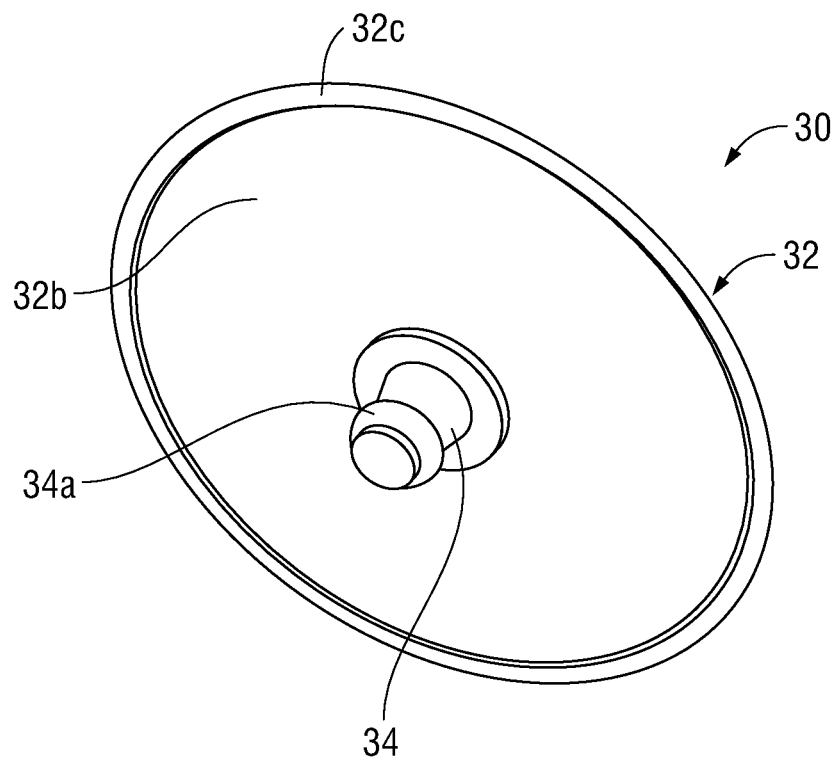
FIG. 15 is a perspective view of the umbrella valve of FIG. 14.

With reference to FIGS. 14 and 15, a passive valve assembly of the plurality of passive valve assemblies 30 is illustrated. Each passive valve assembly of the plurality of passive valve assemblies 30 is substantially similar, and thus, only one passive valve assembly of the plurality of passive valve assemblies 30 will be described in detail herein in the interest of brevity. The passive valve assembly 30 includes an umbrella valve 32 having a generally circular profile extending between a top surface 32a and an opposite, lower surface 32b. The lower surface 32b includes a stem 34 disposed thereon and extending therefrom. The stem 34 is configured to be releasably retained within a hole 22h of a respective aperture 22f. As can be appreciated, the stem 34 includes a bulb or barb 34a disposed thereon having an outer dimension that is greater than the inner dimension of the hole 22h of the aperture 22f, such that a force that is greater than a pressure exerted by the compressor is required to remove the umbrella valve 42 from the hole 22h. The lower surface 32b defines a boss 32c adjacent the outer perimeter of the umbrella valve 32 that is configured to abut or seat against the end surface 22e of a boss 22d of the diffuser 22. In this manner, the air or fluid within the ballonet 16 exerts pressure against the top surface 32a of the umbrella valve 32 and bias the umbrella valve 32 in a first, closed position to form a seal and inhibit air or fluid from entering or exiting the aperture 22f. It is contemplated that the umbrella valve may be formed from one or more materials (e.g., a portion of the umbrella valve 32 being formed from a more flexible material than another portion) and may be formed from a resilient material capable of being used at high altitudes. In no non-limiting embodiment, the umbrella valve 32 is formed from fluorosilicone.

Figure 16:
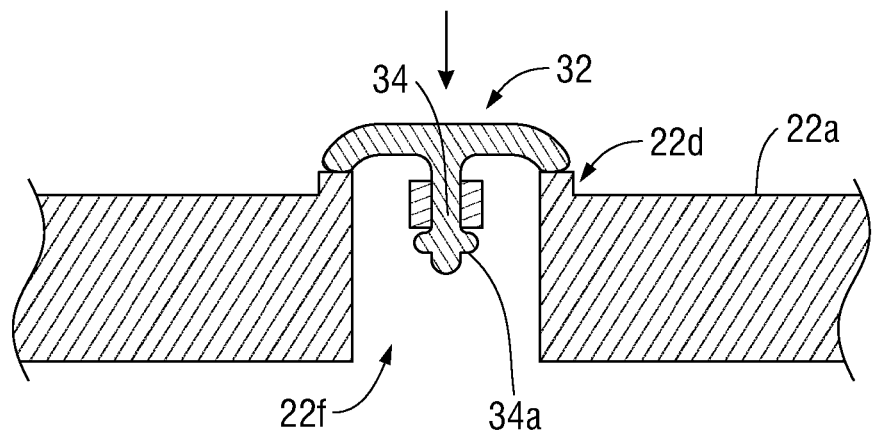
FIG. 16 is a schematic view of a passive valve assembly of the altitude control system of FIG. 2, shown with the umbrella valve in a first, closed position.
Figure 17:
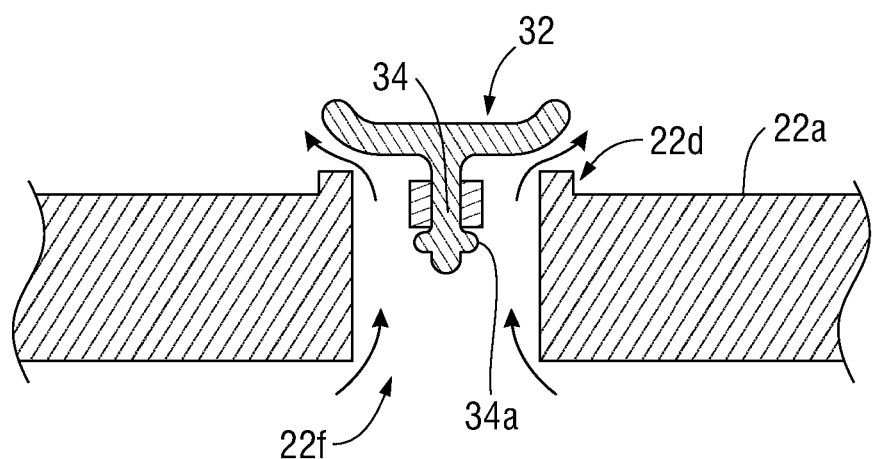
FIG. 17 is a schematic view of the passive valve assembly of FIG. 16, shown with the umbrella valve in a second, open position.

With reference to FIGS. 16 and 17, the stem 34 is dimensioned such that the stem 34 is inhibited from translating within the hole 22h of the aperture 22f. In this manner, to cause the umbrella valve 32 to transition from a first, closed position, where a seal is formed between the umbrella valve 32 and the boss 22d to a second, open position, where a gap is formed between the umbrella valve 32 and the boss 22d to permit the flow of air of fluid through the aperture 22f, the umbrella valve 32 is configured to deflect or otherwise deform (e.g., pull away from the boss 22d of the diffuser). To cause the umbrella valve 32 to transition from the first, closed position to the second, open position, the impeller 54 of the compressor assembly 20 is rotated in a second direction to draw air into the bore 26c of the intake 26, into the plenum 20a, where pressure is exerted against the lower surface 32b of the umbrella valve 32. The impeller 54 is further rotated to generate pressure within the plenum 20a acting against the lower surface 32b of the umbrella valve 32 is greater than the pressure acting against the top surface 32a of the umbrella valve 32 by the air or fluid within the ballonet 16, thereby causing the umbrella valve 32 to deflect and form a gap between the lower surface 32b of the umbrella valve 32 and the boss 22d of the diffuser 22. Once the desired mass of air or fluid within the ballonet 16 is achieved, the motor 52 shuts off and stops the impeller 54 from rotating, thereby decreasing the pressure acting against the lower surface 32b of the umbrella valve 32 to below the pressure acting against the top surface 32a of the umbrella valve 32, causing the umbrella valve 32 to transition from the second, open position to the first, closed position to inhibit further air or fluid from flowing through the aperture 22f.

Figure 18:
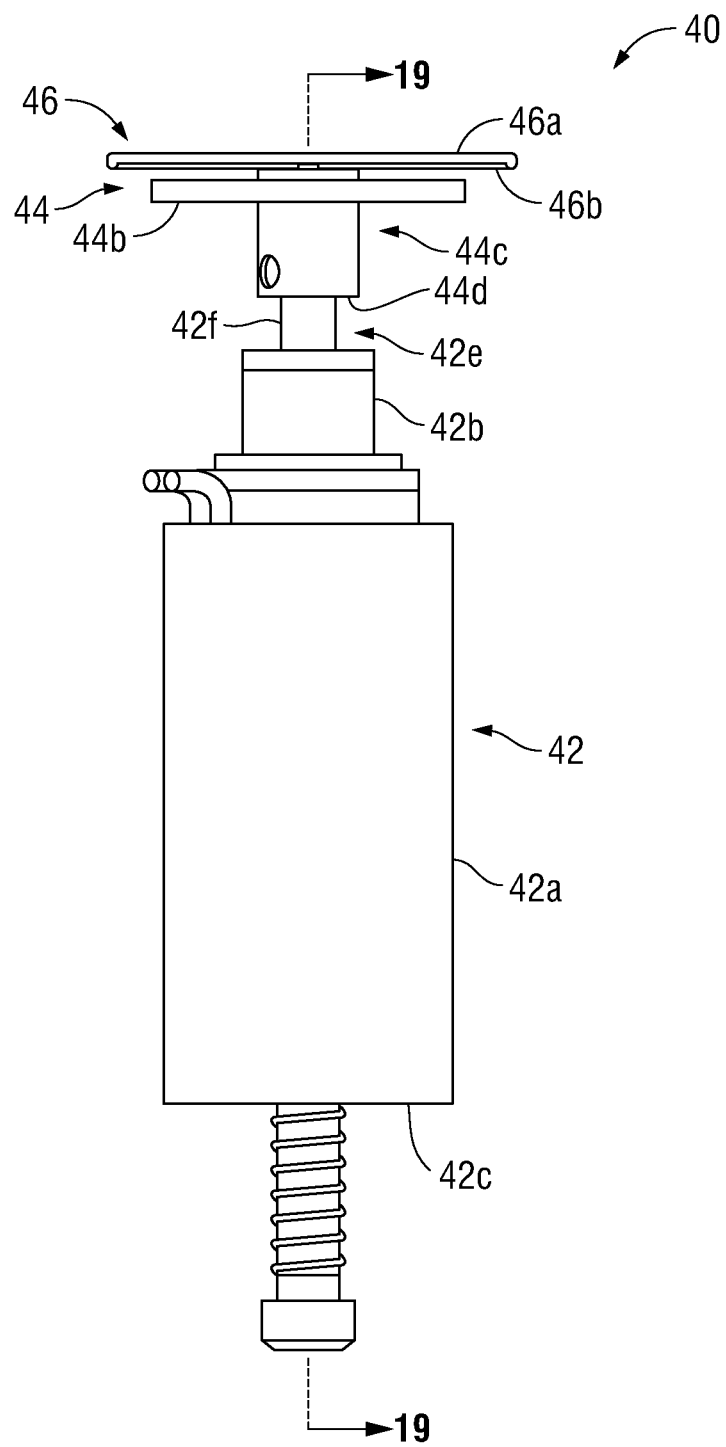
FIG. 18 is an elevation view of an active valve assembly of the altitude control system of FIG. 2.
Figure 19:
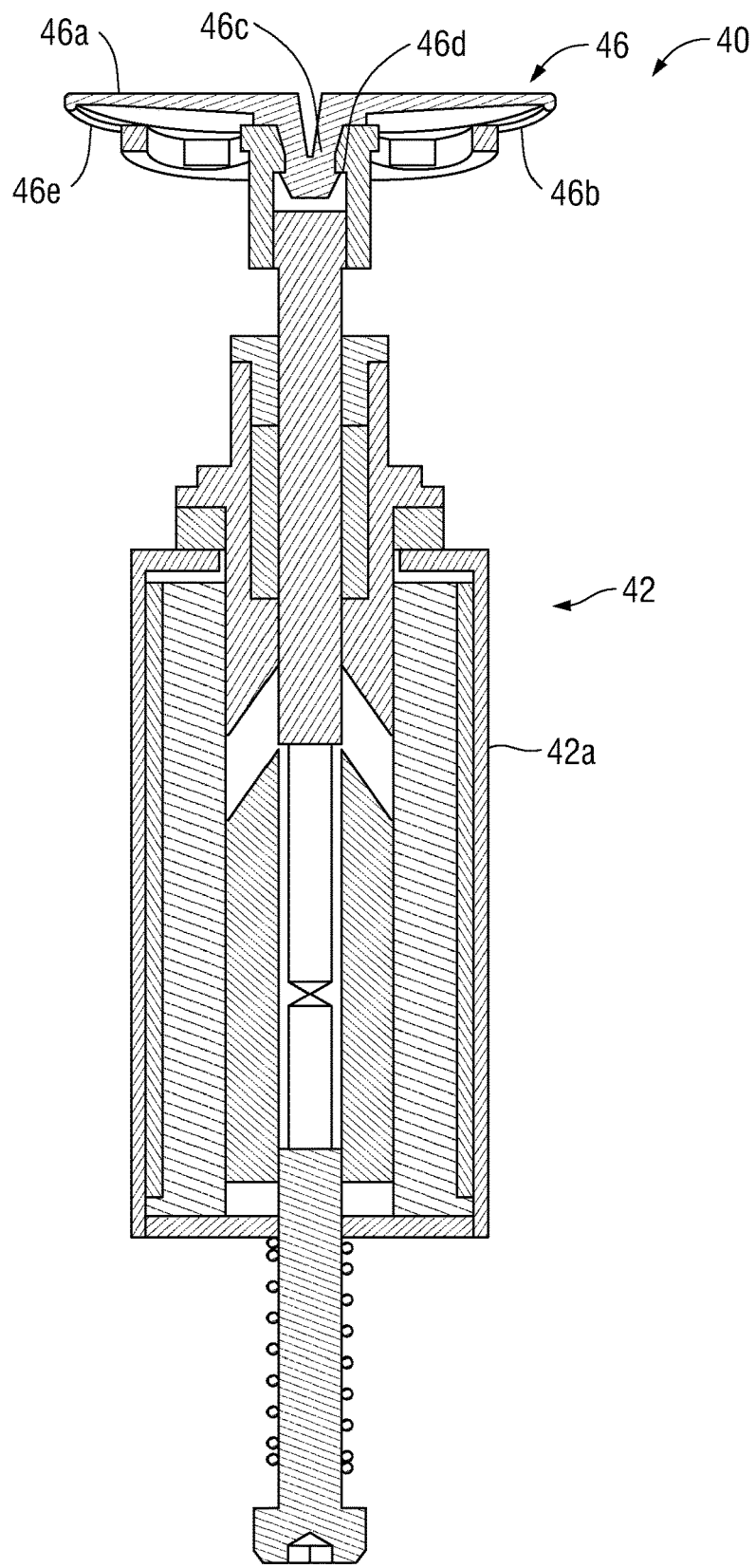
FIG. 19 is a cross-sectional view of the active valve assembly of FIG. 18, taken alone section-line 19-19 of FIG. 18.
Figure 20:
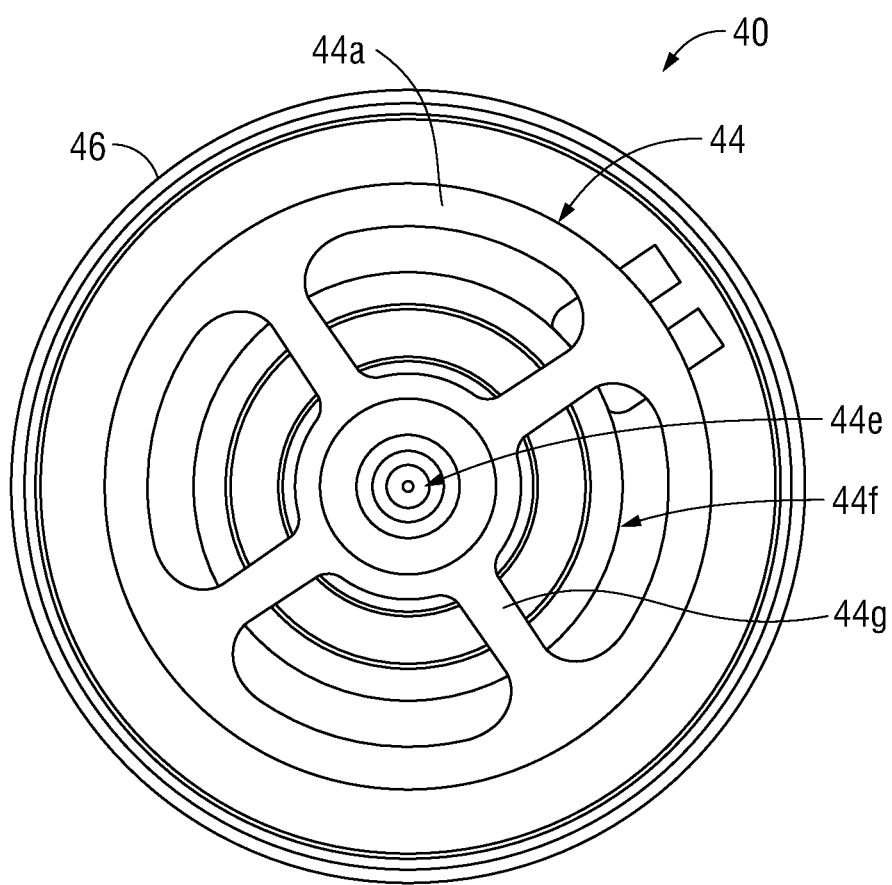
FIG. 20 is a plan view of the active valve assembly of FIG. 18.
Figure 21:
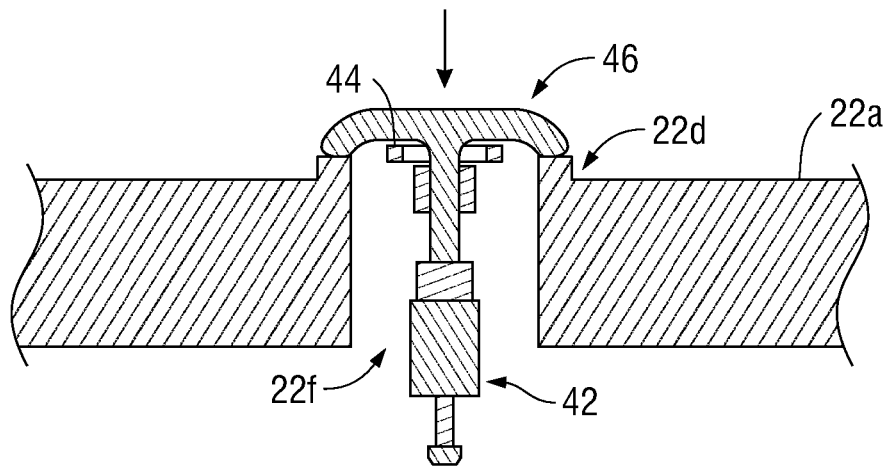
FIG. 21 is a schematic view of the active valve assembly of FIG. 18, shown with the umbrella valve in a first, closed position.
Figure 22:
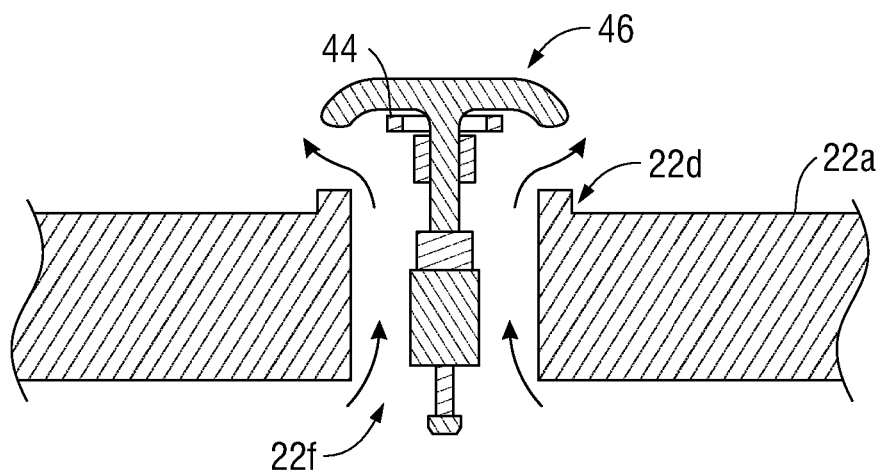
FIG. 22 is a schematic view of the active valve assembly of FIG. 18, shown with the umbrella valve in a second, open position.

Turning to FIGS. 18-20, an active valve assembly of the plurality of active valve assemblies 40 is illustrated. Each active valve assembly of the plurality of active valve assemblies 40 is substantially similar, and thus, only one active valve assembly of the plurality of active valve assemblies 40 will be described in detail herein in the interest of brevity. The active valve assembly 40 includes a solenoid 42, a valve support 44 coupled to a portion of the solenoid 42, and an umbrella valve 46 coupled to a portion of the valve support 44, such that actuation of the solenoid 42 effectuates movement of the valve support 44, and thus, the umbrella valve 46, as will be described in further detail hereinbelow. It is contemplated that the solenoid 42 may be any suitable solenoid capable of opening and closing the active valve assembly 40 at high altitude. In one non-limiting embodiment, the solenoid 42 is a double-latching solenoid. In this manner, the solenoid 42 is configured to have a first, retracted position, and a second, extended position, each of which may be maintained without the application of electrical power to the solenoid 42.

The solenoid 42 includes a housing 42a extending between a first end portion 42b and a second, opposite end portion 42c. The first end portion 42b is configured to selectively engage a respective through-hole of the plurality of through-holes 24e of the compressor housing 24. It is contemplated that each through-hole of the plurality of through-holes 24e may be configured to engage a respective first end portion 42b of the solenoid 42 using any suitable means, such as a threaded connection, snap-fit, friction fit, adhesives, fasteners, welding, amongst others.

The solenoid 42 includes a shaft 42d that extends through a bore 42e (FIG. 19) defined through the first and second end portions 42b, 42c of the housing 42a. The shaft 42d is configured to be translated from a first, retracted position, to a second, extended position using electromagnetic energy. A first end portion 42f of the shaft 42d is configured to releasably retain the valve support 44 thereon using any suitable means, such as a threaded connection, friction fit, snap-fit, adhesives, welding, snap-rings, set screws, and fasteners, amongst others.

The valve support 44 defines a generally circular profile and extends between a first end surface 44a, and a second, opposite end surface 44b, although it is contemplated that the valve support 44 may define any suitable profile. The second surface 44b defines a boss 44c thereon that extends therefrom and terminates at a third end surface 44d. The first and third end surfaces 44a, 44d define an aperture 44e therethrough that is configured to receive a portion of the shaft 42d of the solenoid 42 therein. The aperture 44e is configured to selectively couple the valve support 44 to the shaft 42d of the solenoid 42 using any suitable means, such as those described hereinabove. The first and second end surface 44a, 44b define a plurality of slots 44f therethrough that form a corresponding plurality of spokes or crossmembers 44g. As can be appreciated, each slot of the plurality of slots 44f is separated from one another by a corresponding spoke 44g. The outer dimension of the valve support 44 is such that the valve support 44 is capable of being slidably received within a respective aperture of the plurality of apertures 22f.

The umbrella valve 46 defines a generally circular profile and extends between a first end surface 46a and a second, opposite end surface 46b, although it is contemplated that the umbrella valve 46 may define any suitable profile. The umbrella valve 46 includes an outer dimension that is larger than an outer dimension of the valve support 44, such that a portion of the second end surface 46b of the umbrella valve extends radially beyond the outer circumference of the valve support 44. In this manner, the exposed portion of the second end surface 46b of the umbrella valve 46 is exposed. The lower surface 46b of the umbrella valve 46 defines a boss 46e adjacent an outer perimeter of the umbrella valve that is configured to abut a portion of the end surface 22e of a respective boss of the plurality of bosses 22d of the diffuser 22 to form a seal and inhibit air or fluid from entering or exiting the aperture 22f. The second end surface 46b of the umbrella valve 46 defines a stem 46c thereon that extends therefrom. A portion of the stem 46c includes a bulb or barb 46d disposed thereon having an outer dimension that is greater than the inner dimension of the aperture 44e of the valve support 44 such that the umbrella valve 46 is captured therein and is inhibited from moving relative to the valve support 44. In this manner, it is contemplated that the aperture 44e of the valve support 44 may include an annular groove (not shown) or other feature capable of capturing the bulb 46d of the umbrella valve 46 to inhibit movement thereof relative to the valve support 44.

Transitioning the umbrella valve 46 from the first, closed position, to the second, open position, may be effectuated in a similar manner to that of the umbrella valve 32 of the passive valve assembly 30, and therefore will not be described in detail herein in the interest of brevity. As can be appreciated, causing the umbrella valve 46 to transition from the first, closed position, to the second, open position without actuating the solenoid 42 utilizes less electrical energy and therefore increases the efficiency of the altitude control system 18.

Figure 2:
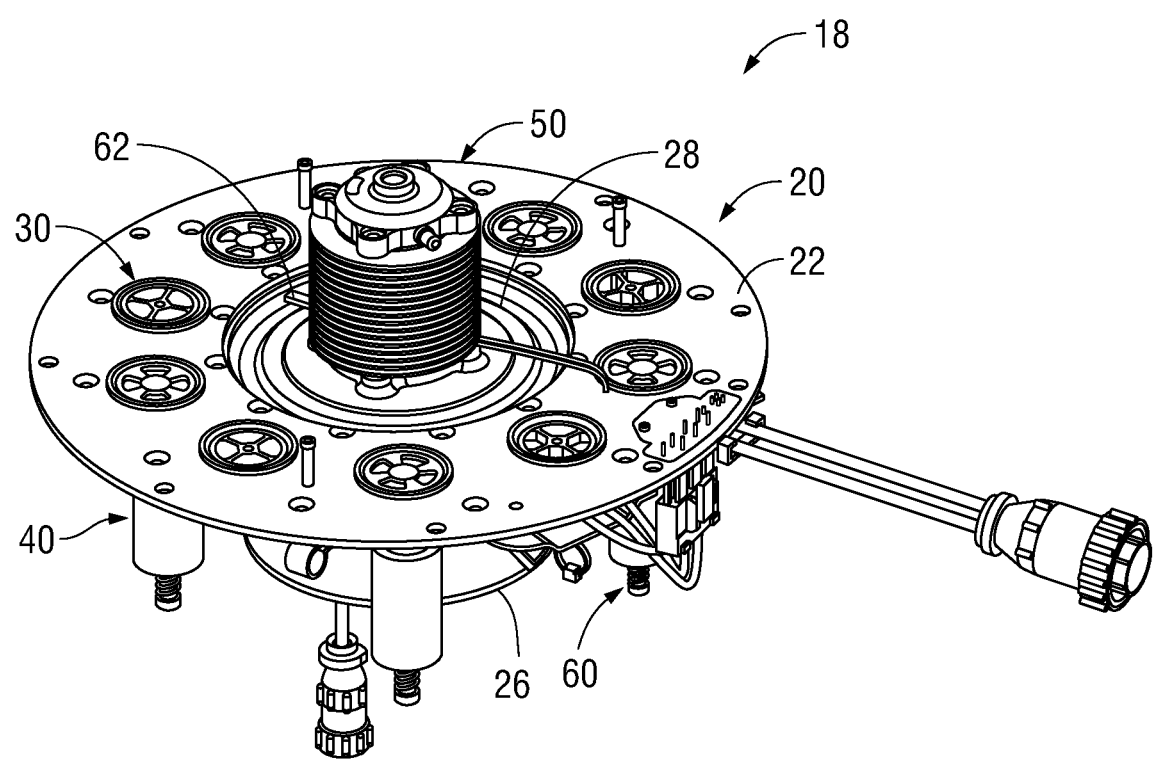
FIG. 2 is a perspective view of an altitude control system of the unmanned aerial vehicle of FIG. 1.
Figure 3:
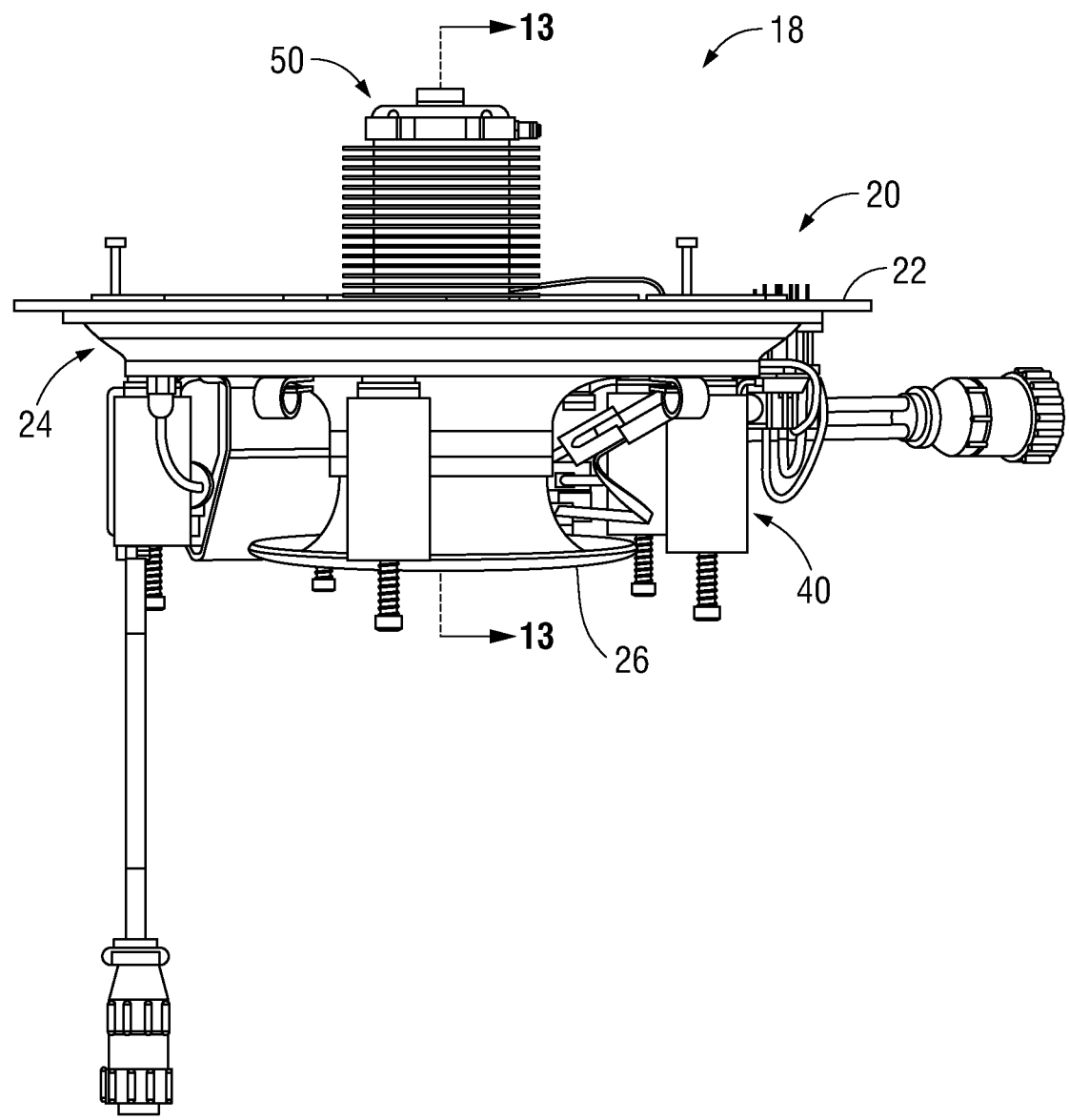
FIG. 3 is an elevation view of the altitude control system of FIG. 2.
Figure 4:
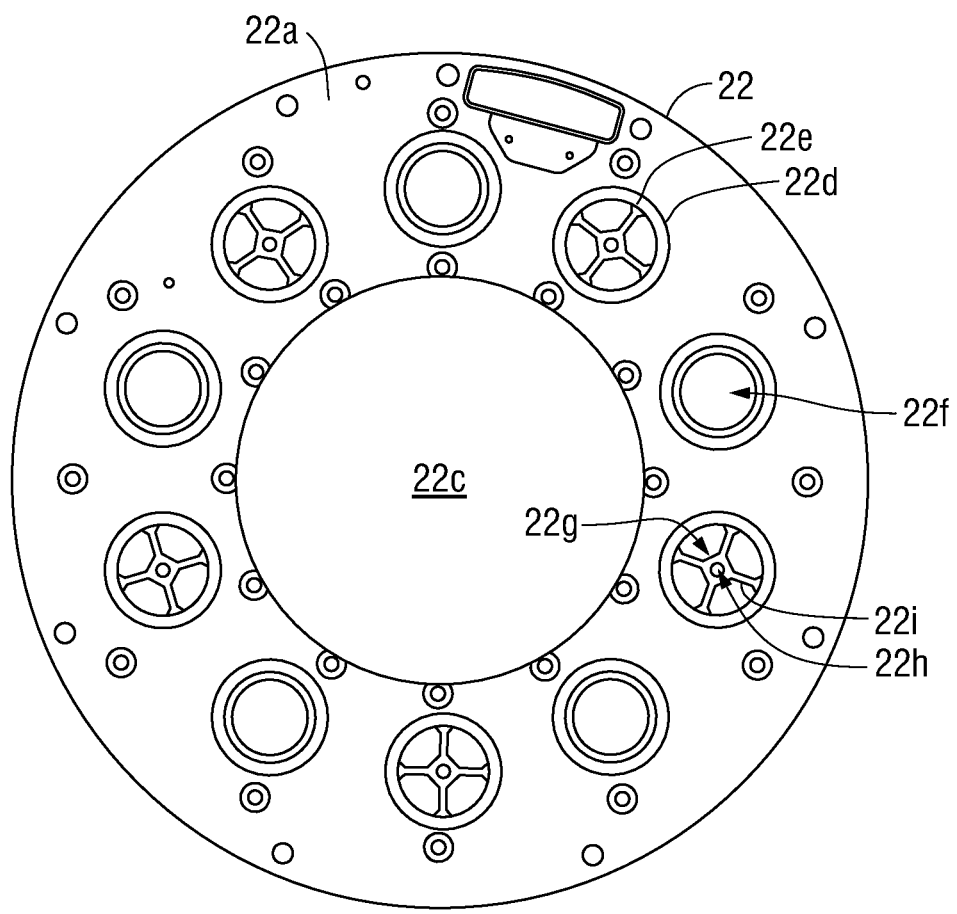
FIG. 4 is a plan view of an upper plate of a diffuser of a compressor of the altitude control system of FIG. 2.
Figure 5:
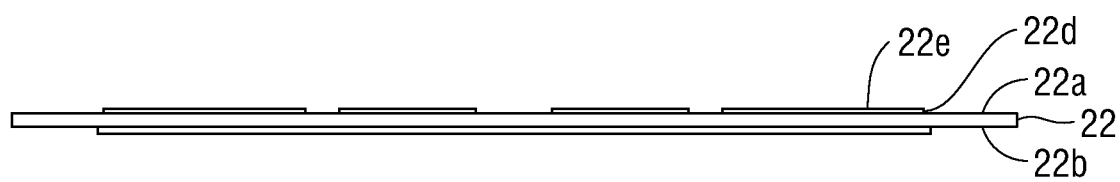
FIG. 5 is an elevation view of the upper plate of FIG. 4.
Figure 6:
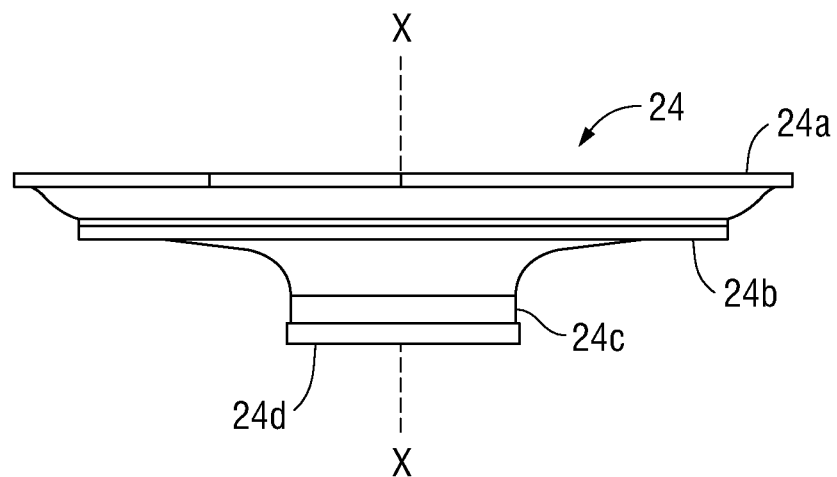
FIG. 6 is an elevation view of a compressor housing of the compressor of the altitude control system of FIG. 2.
Figure 7:
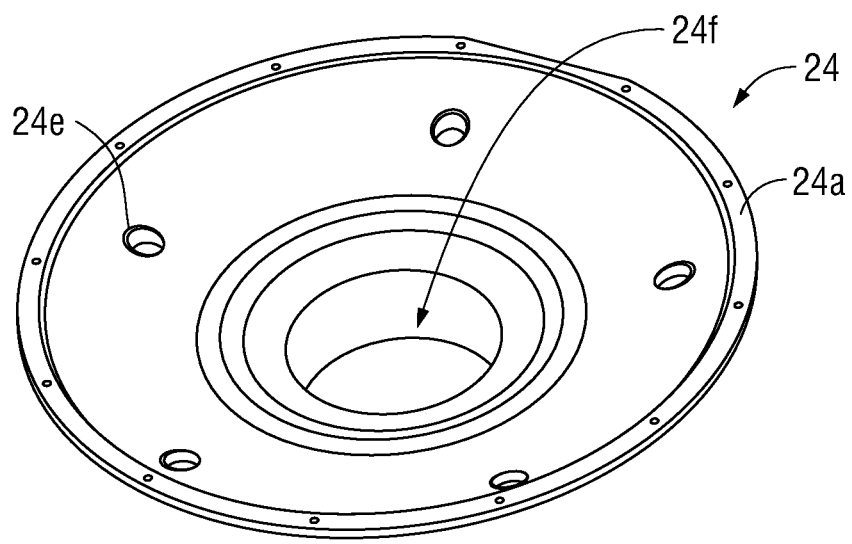
FIG. 7 is a perspective view of the compressor housing of FIG. 6.
Figure 8:
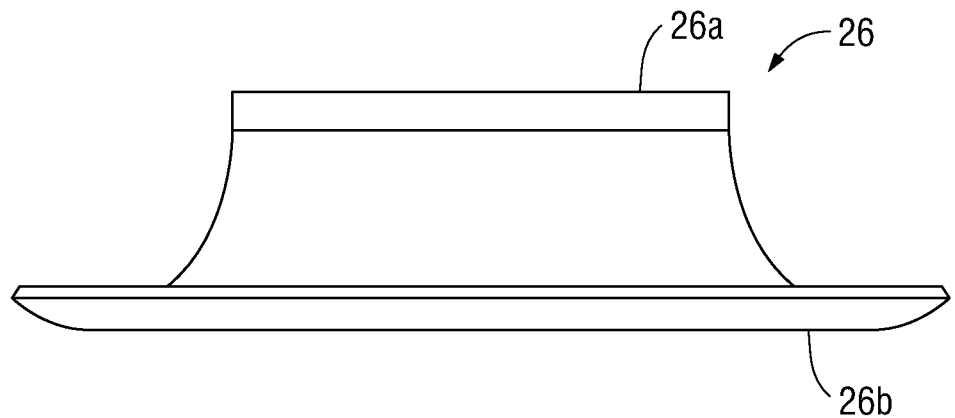
FIG. 8 is an elevation view of an intake of the compressor of the altitude control system of FIG. 2.
Figure 9:
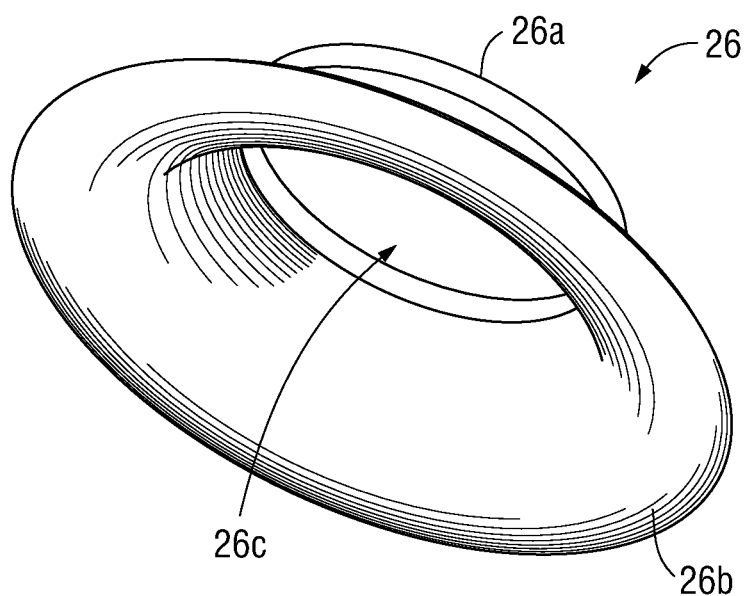
FIG. 9 is a perspective view of the intake of FIG. 8.
Figure 10:
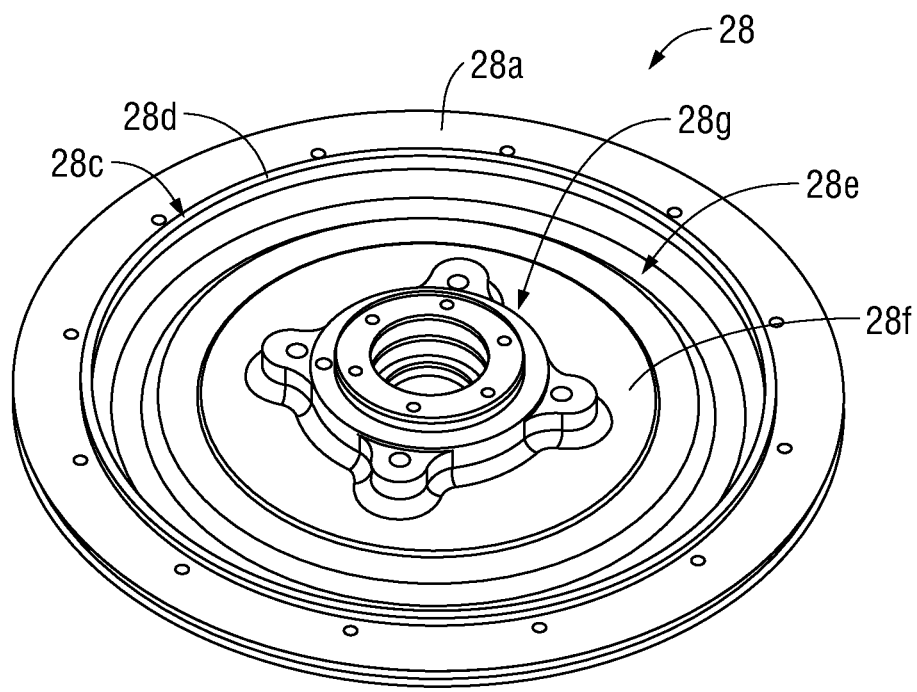
FIG. 10 is a top perspective view of a compressor plate of the compressor of the altitude control system of FIG. 2.
Figure 11:
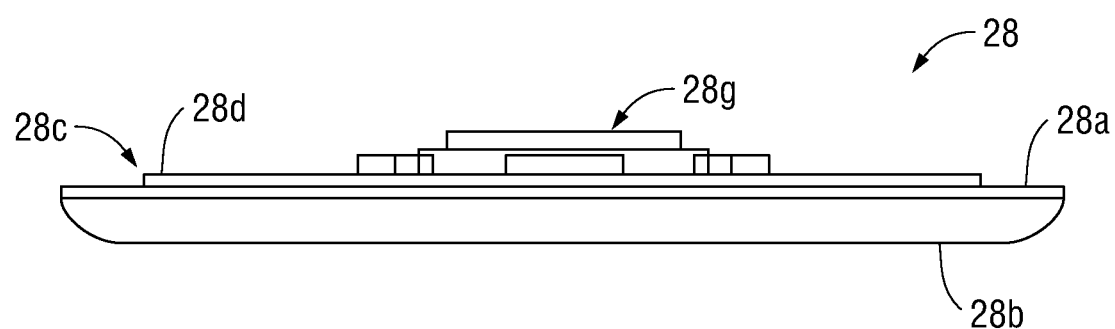
FIG. 11 is an elevation view of the compressor plate of FIG. 10.
Figure 12:
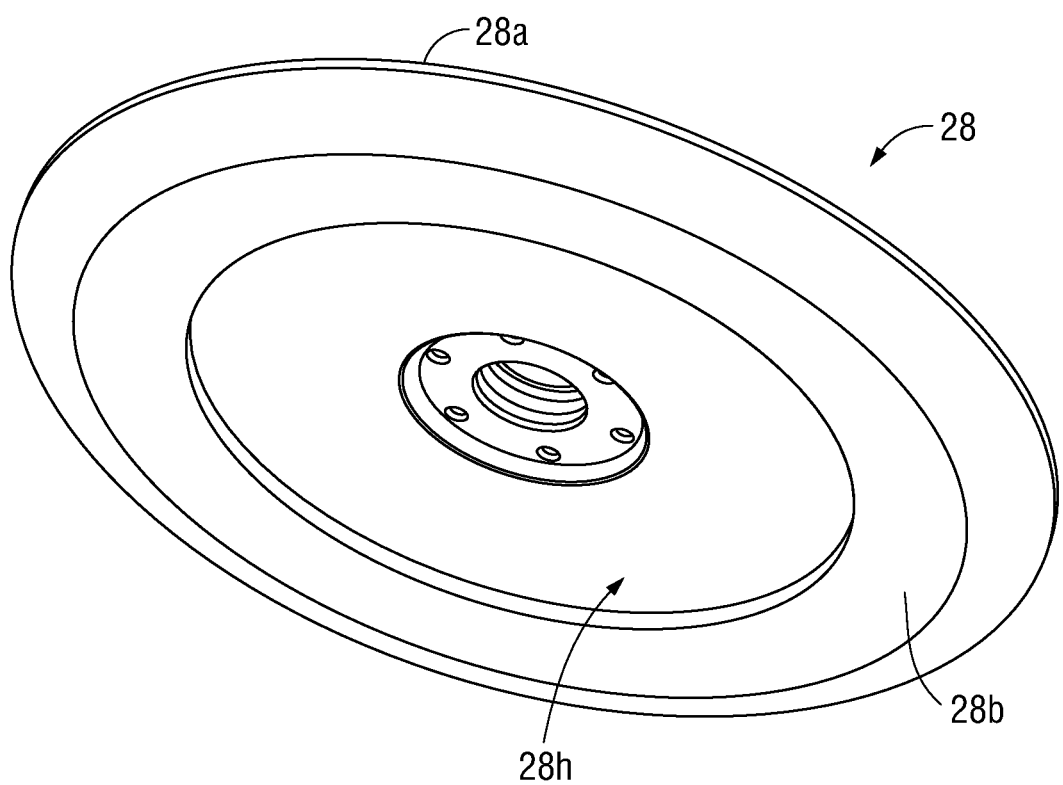
FIG. 12 is a bottom perspective view of the compressor plate of FIG. 10.
Figure 23:
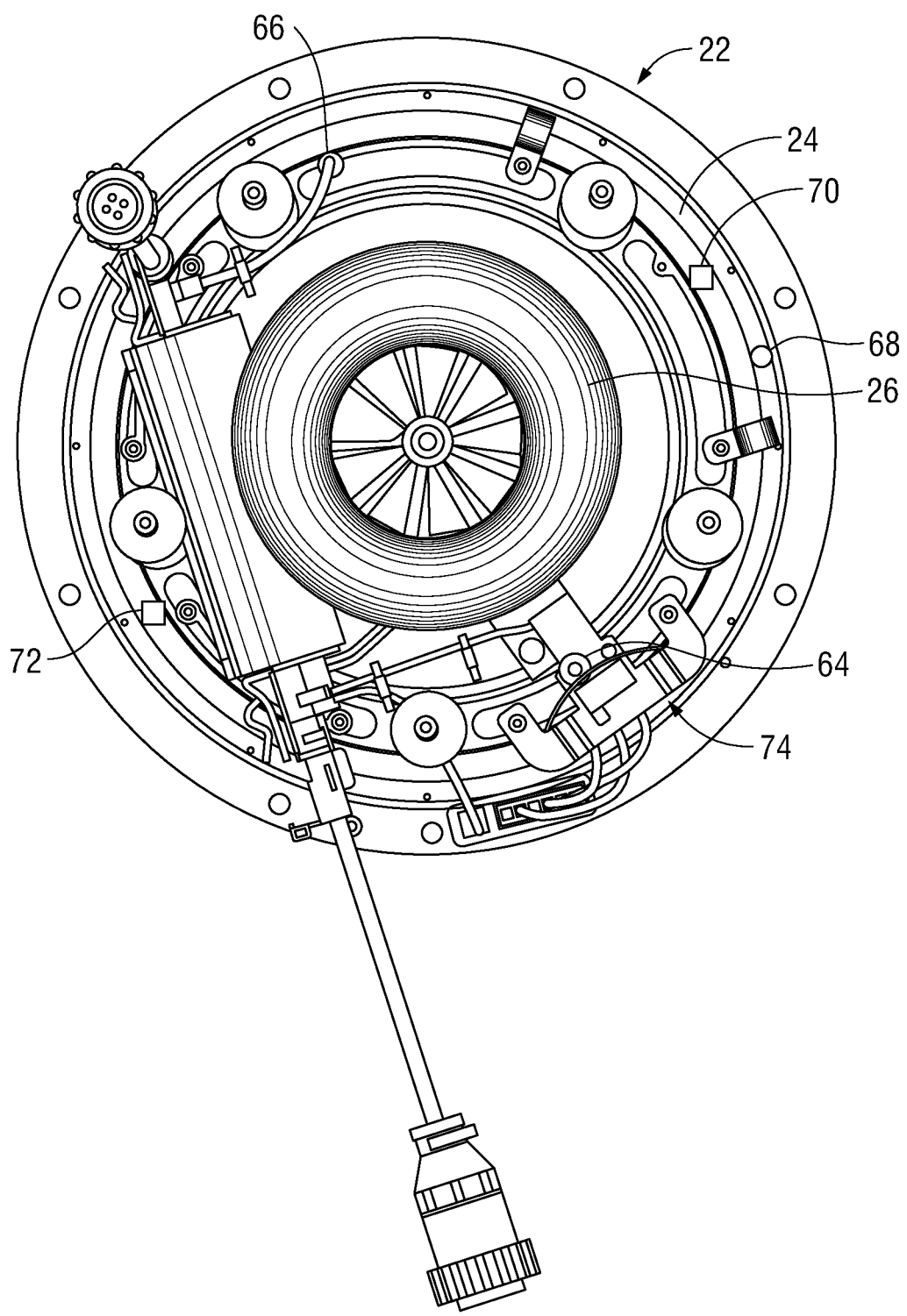
FIG. 23 is a bottom view of the altitude control system of FIG. 2.

With reference to FIGS. 2 and 23, the electrical control assembly 60 includes a motor thermal sensor 62, an electronic speed control thermal sensor 64, a compressor housing thermal sensor 66, a barometer 68, a microphone 70, and a differential pressure sensor 72. The motor thermal sensor 62 is coupled to a housing of the motor 52 of the compressor assembly 20 to determine the temperature at which the motor 52 is running. The electronic speed control thermal sensor 64 is coupled to an electronic speed control 74 disposed on a portion of the altitude control system 18. As can be appreciated, the electronic speed control thermal sensor 64 determines the temperature at which the electronic speed control 74 is operating. The compressor housing thermal sensor 66 is coupled to a portion of the compressor housing 24 of the compressor assembly 20 and determines the temperature of the compressor housing 24. The barometer 68 measures the ambient air pressure outside the balloon. The differential pressure sensor 72 measures the pressure differential between the ambient environment and the inside of the balloon and ballonet. The microphone 70 is coupled to a portion of the altitude control system 18 and monitors the passive valve assembly 30 and the active valve assembly 40 for leaks.

The motor thermal sensor 62 and the electronic speed control thermal sensor 64 cooperate to ensure that the motor 52 of the compressor assembly 20 is not driven too quickly (e.g., run too fast, thus increasing the temperature of the motor 52 and decreasing electrical efficiency). The compressor housing thermal sensor 66, the barometer 68, and the pressure differential sensor 72 cooperate to determine the temperature and pressure of the air of fluid within the plenum 20a to aid in determining the increase in mass of the air or fluid within the ballonet 16. As can be appreciated, the electrical control assembly 60 enables the altitude control system 18 to operate more efficiently and reduce the amount of electrical energy utilized to maneuver the unmanned aerial vehicle 10.

Referring to FIGS. 1-23, in operation, to cause the unmanned aerial vehicle 10 to ascend, each solenoid valve 42 of the plurality of active valve assemblies 40 causes each respective umbrella valve 46 to translate from the first, closed position, to the second, open position, to enable air or fluid within the ballonet 16 to enter each respective aperture 22f of the upper plate 22, enter the plenum 20a and exit the bore 26c of the intake 26 into the surrounding atmosphere. In embodiments, the air or other fluid may be drawn or forced out of the ballonet 16 using the impeller 54, internal superpressure of the balloon 12, or other suitable means. As the air or other fluid within the ballonet 16 is removed, the mass of the air or fluid within the ballonet 16 is reduced. As such, the buoyancy of the balloon 12 is increased, thereby causing the unmanned aerial vehicle 10 to ascend. It is contemplated that the ascent rate of the unmanned aerial vehicle 10 may be altered by varying the number of active valve assemblies 40 that are opened. As can be appreciated, the number of umbrella valves 46 that are opened may vary such that the ascent rate of the unmanned aerial vehicle 10 may be increased or slowed, depending upon the number of umbrella valves 46 that are opened. In this manner, less than all of the umbrella valves 46 may be opened to cause the unmanned aerial vehicle 10 to ascend slower than if all of the umbrella valves 46 were opened.

Once the desired altitude is reached, each solenoid valve 42 of the plurality of active valve assemblies 40 causes each respective umbrella valve 46 to translate from the second, open position, to the first, closed position to inhibit air or fluid within the ballonet 16 from flowing through each respective aperture 22f of the upper plate and exiting the ballonet 16.

To cause the unmanned aerial vehicle 10 to descend, the motor 52 of the compressor assembly 20 is caused to be rotated in a first direction, which in turn, causes the impeller 54 to rotate in a corresponding first direction and draw air from the surrounding atmosphere into the bore 26c of the intake 26 and into the plenum 20a. As the pressure within the plenum 20a increases, the pressure acting against the lower surface 32b of the umbrella valve 32 is greater than the pressure acting against the top surface 32a of the umbrella valve 32 by the air or fluid within the ballonet 16 and causes the umbrella valve 32 to deflect and transition from a first, closed position, to a second, open position, thereby permitting air from within the plenum 20a to flow through each respective aperture 22f and into the ballonet 16, thereby increasing the mass of air or fluid therewithin. As can be appreciated, as the amount of air or other fluid within the ballonet 16 is increased, the mass of the air or fluid within the ballonet 16 is increased. As such, the buoyancy of the balloon 12 is increased, thereby causing the unmanned aerial vehicle 10 to descend. It is contemplated that the descent rate of the unmanned aerial vehicle 10 may be altered by opening one or more active valve assemblies of the plurality of active valve assemblies 40. As can be appreciated, the number of umbrella valves 46 that are opened may vary such that the descent rate of the unmanned aerial vehicle 10 may be increased or slowed, depending upon the number of umbrella valves 46 that are opened. In this manner, less than all of the umbrella valves 46 may be opened to cause the unmanned aerial vehicle 10 to descend slower than if all of the umbrella valves 46 were opened.

Once the desired altitude is reached, rotation of the motor 52 is caused to be stopped, which in turn, stops rotation of the impeller 54, thereby decreasing the pressure acting against the lower surface 32b of the umbrella valve 32 to below the pressure acting against the top surface 32a of the umbrella valve 32, causing the umbrella valve 32 to transition from the second, open position to the first, closed position to inhibit further air or fluid from flowing through the aperture 22f.

While several embodiments of the disclosure have been shown in the drawings, it is not intended that the disclosure be limited thereto, as it is intended that the disclosure be as broad in scope as the art will allow and that the specification be read likewise. Therefore, the above description should not be construed as limiting, but merely as exemplifications of particular embodiments.

What is claimed is:

1. An altitude control system for an aerial vehicle, comprising:
    a compressor assembly defining a plenum therein;
    one or more valve assemblies coupled to the compressor assembly, the one or more valve assemblies are in fluid communication with the plenum, the one or more valve assemblies include:
        an umbrella valve;
        a solenoid coupled with the umbrella valve; and
        wherein the valve assembly is configured for active and passive operation:
            in active operation the solenoid is configured to actively move the umbrella valve and permit communication with the plenum; and
            in passive operation the umbrella valve is configured to passively move according to pressurized fluid generated by the compressor assembly and permit communication with the plenum.

2. The altitude control system according to claim 1, wherein the compressor assembly includes:
    a motor; and
    an impeller in mechanical communication with the motor, such that rotation of the motor causes a corresponding rotation of the impeller.

3. The altitude control system according to claim 1, wherein the compressor assembly includes a diffuser having an upper surface, the upper surface defining a plurality of apertures therethrough, the plurality of apertures in fluid communication with the plenum.

4. The altitude control system according to claim 3, wherein the one or more valve assemblies are each disposed within respective apertures of the plurality of apertures of the diffuser.

5. The altitude control system according to claim 4, wherein the umbrella valve is configured to abut a portion of the upper surface of the diffuser to inhibit the flow of fluid through the aperture of the plurality of apertures of the diffuser.

6. The altitude control system according to claim 5, wherein the umbrella valve is configured to transition from a first, closed position where fluid is inhibited from flowing through the aperture of the plurality of apertures to a second, open position where fluid is permitted to flow through the aperture of the plurality of apertures.

7. The altitude control system according to claim 1, wherein the active valve assembly includes:
    a valve support coupled to a portion of the solenoid and the umbrella valve.

8. The altitude control system according to claim 1, wherein the solenoid is configured to translate the umbrella valve from a first, closed position where fluid is inhibited from flowing through the aperture of the plurality of apertures to a second, open position where fluid is permitted to flow through the aperture of the plurality of apertures.

9. The altitude control system according to claim 1, wherein the compressor assembly includes:
    a diffuser;
    a compressor housing configured to selectively engage the diffuser; and
    an intake configured to selectively engage the compressor housing.

10. The altitude control system according to claim 9, wherein the diffuser and the compressor housing cooperate to define the plenum therebetween.

11. The altitude control system according to claim 9, wherein the intake includes an upper portion and a lower portion, the lower portion defining a bellmouth configuration.

12. An aerial vehicle, comprising:
    a balloon configured to retain a lifting gas therein, the balloon including a ballonet disposed therein that is configured to retain ballast gas therein; and
    an altitude control system, comprising:
        a compressor assembly defining a plenum therein;
        one or more valve assemblies coupled to the compressor assembly and in fluid communication with the plenum, the one or more valve assemblies include:
            an umbrella valve;
            a solenoid coupled with the umbrella valve; and
            wherein the valve assembly is configured for active and passive operation:
                in active operation the solenoid is configured to actively move the umbrella valve and permit communication with the plenum; and
                in passive operation the umbrella valve is configured to passively move according to pressurized fluid generated by the compressor assembly and permit communication with the plenum.

13. The unmanned aerial vehicle according to claim 12, wherein the compressor assembly includes a diffuser having an upper surface, the upper surface defining a plurality of apertures therethrough, the plurality of apertures in fluid communication with the plenum.

14. The unmanned aerial vehicle according to claim 13, wherein the one or more valve assemblies are disposed within respective apertures of the plurality of apertures of the diffuser.

15. The unmanned aerial vehicle according to claim 12, wherein the active valve assembly includes:
    a valve support coupled to a portion of the solenoid and the umbrella valve.

\* \* \* \* \*